United States Patent [19]

Rich et al.

[11] 4,142,955

[45] Mar. 6, 1979

[54] METHOD FOR THE INITIATION OF CHEMICAL REACTIONS BY LOW PRESSURE OPTICAL PUMPING

[75] Inventors: Joseph W. Rich, East Aurora; Richard C. Bergman, Corfu; Charles E. Treanor, Williamsville, all of N.Y.

[73] Assignee: Calspan Corporation, Buffalo, N.Y.

[21] Appl. No.: 833,323

[22] Filed: Sep. 14, 1977

[51] Int. Cl.² ............................................. B01J 1/10
[52] U.S. Cl. ...................... 204/157.1 R; 204/DIG. 12
[58] Field of Search ................. 204/DIG. 11, 157.1 R

[56] References Cited

U.S. PATENT DOCUMENTS

| 3,719,454 | 3/1973 | Shang | 204/DIG. 11 |
| 3,740,552 | 6/1973 | Pressman | 204/DIG. 11 |
| 4,020,350 | 4/1977 | Ducas | 204/DIG. 11 |

OTHER PUBLICATIONS

Osgood, Applied Physics Letters, vol. 28, No. 6, 15 Mar. 76, pp. 342-345.

*Primary Examiner*—Howard S. Williams
*Attorney, Agent, or Firm*—Allen J. Jaffe; David J. Zobkiw

[57] ABSTRACT

When using CO as the absorbing and lasing species for vibration-vibration energy transfer and subsequent vibration-vibration pumping, CO can be made to dissociate and subsequently form $C_2$ with isotope separation, or CO may be made to chemically react with $N_2$ to produce CN with isotope separation.

5 Claims, 13 Drawing Figures

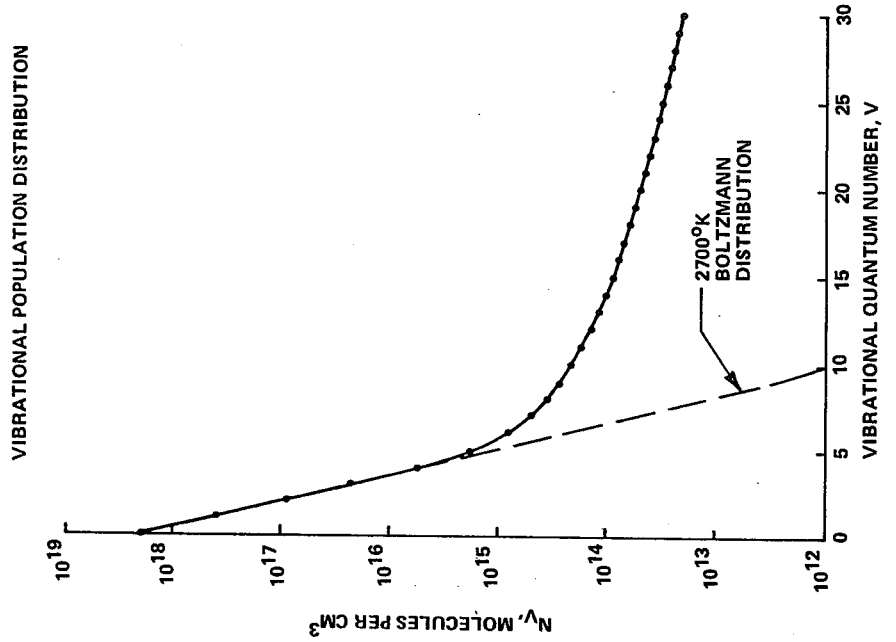
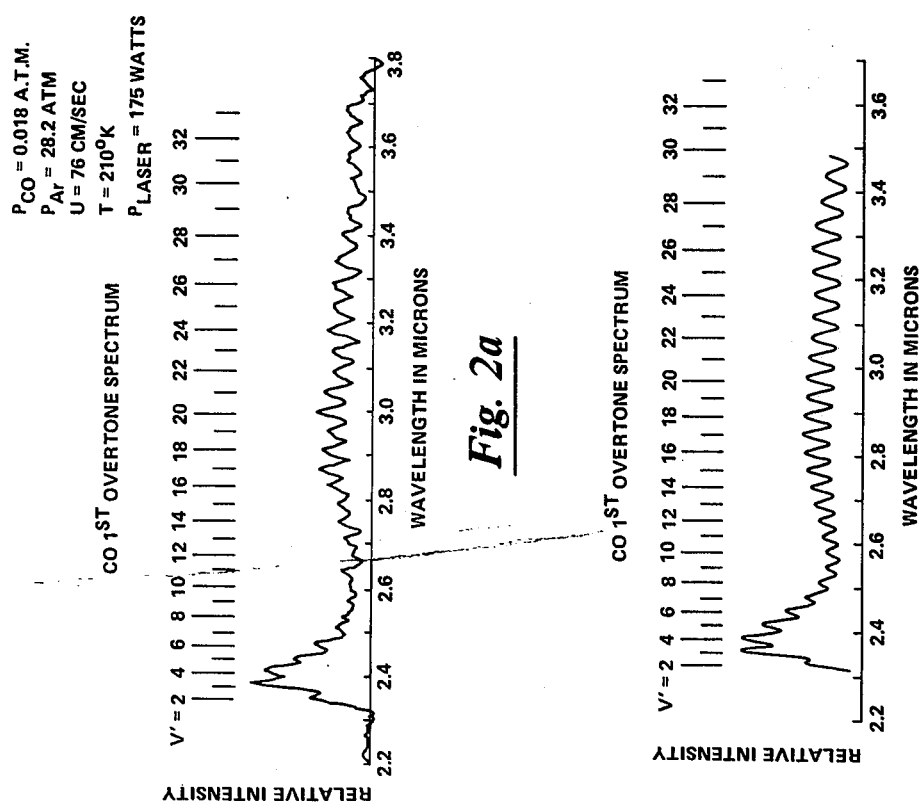

METHOD FOR THE INITIATION OF CHEMICAL REACTIONS BY LOW PRESSURE OPTICAL PUMPING

The invention herein described was made in the course of or under a contract with the U.S. Air Force.

The use of laser radiation to initiate and promote chemical reactions is the subject matter of commonly assigned U.S. Pat. No. 4,012,301. According to the teachings of that patent, the reactants are pressurized so that their vibration-rotation spectrum can be broadened to the point that laser radiation can be absorbed without the need for exact coincidence between a line or lines of the spectrum of the reactant and that of the pumping laser. Pressures on the order of thirty atmospheres were used to achieve the requisite degree of pressure broadening.

Where the absorbing and lasing species are the same, pressure broadening is not necessary since the lines of the spectrum will be identical. Under certain additional conditions of low cell pressure, particular flow velocities and gas concentrations, as much as 70% of the pump laser beam can be absorbed and power loadings of the CO vibrational mode are obtained which are higher than those obtainable in electric discharge excitation.

It is an object of this invention to provide a method of dissociation by optically initiated vibration-vibration pumping.

It is an additional object of this invention to provide a method for isotope separation.

It is a further object of this invention to provide a method for initiating chemical reactions by low pressure optical pumping. These objects, and others as will become apparent hereinafter, are accomplished by the present invention.

Basically, the present invention employs a supersonic flow, continuous wave, carbon monoxide laser as a pump laser. Where the pumped and pumping species are both CO, the pumped CO may be made to dissociate with isotope separation. Where the pumped CO is contained in a mixture of nitrogen and diluent, a chemical reaction can be initiated that will produce CN.

BRIEF DESCRIPTION OF THE DRAWINGS

For a fuller understanding of the present invention, reference should now be had to the following detailed description thereof taken in conjunction with the accompanying drawings wherein:

FIG. 2a is an experimentally derived IR emission spectra from the CO first overtone;

FIG. 2b is a computer-generated spectrum corresponding to FIG. 2a;

FIG. 3 is a plot of the inferred vibrational population distribution;

DESCRIPTION OF THE PREFERRED EMBODIMENT

Figure 1:
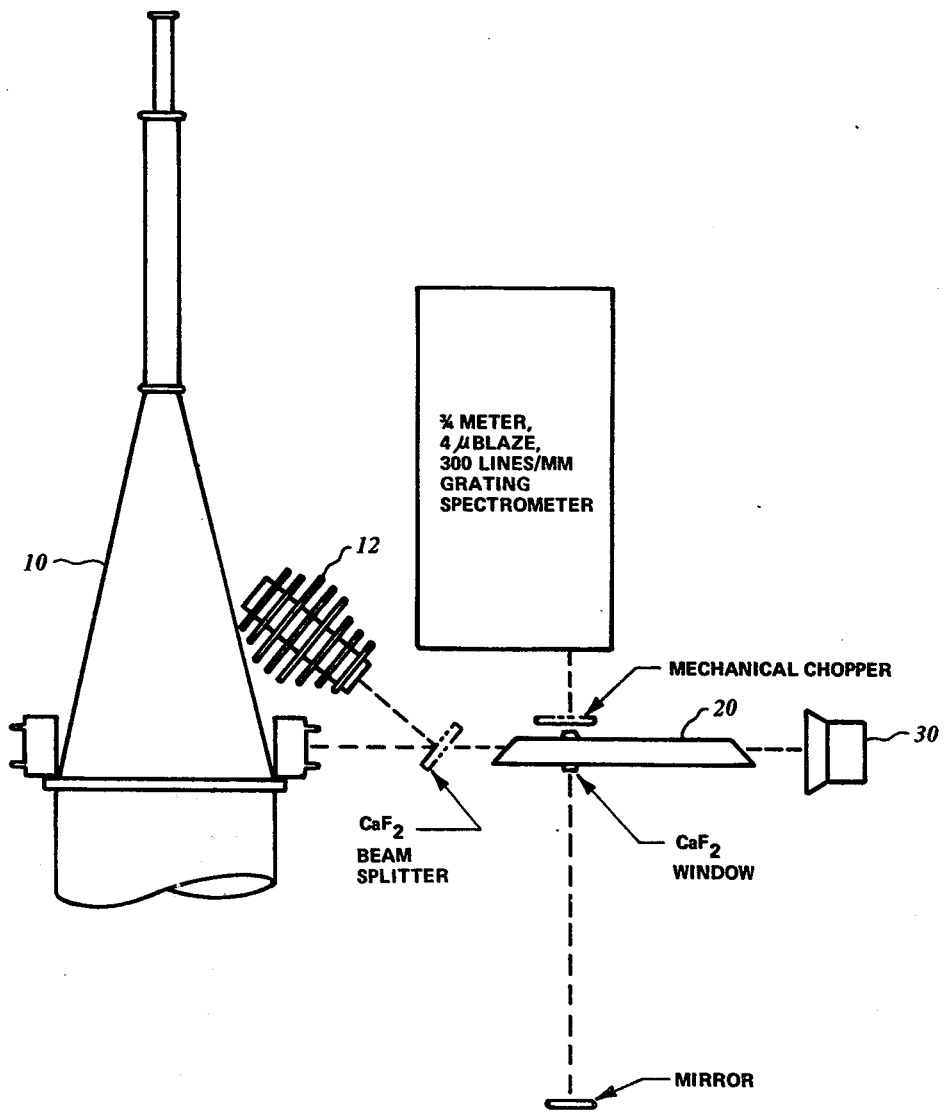
FIG. 1 is a schematic representation of the apparatus.

In FIG. 1, the numeral 10 generally designates a CO pumping laser which is the supersonic flow CO laser that is the subject matter of U.S. Pat. No. 3,811,095. The flow through absorption cell 20 is axially aligned with the output of pumping laser 10. Radiation from the electrically excited supersonic flow c.w. CO laser 10 is admitted along the axis of the cell 20 through a calcium fluoride window (not illustated) (see reference 2). The degree of absorption of the laser beam by the gas(es) is determined by measuring the power incident upon and transmitted through the cell 20 using thermopile power meters 12 and 30, respectively.

The apparatus illustrated in FIG. 1 is essentially that described in U.S. Pat. No. 4,012,301 and Reference 3. For a carbon monoxide and argon mixture, the pump laser radiation is absorbed by the lower vibrational states of the carbon monoxide in the cell. Vibration-to-vibration (V-V) pumping as taught in the theory of Treanor et al. (see reference 4) quickly populates the upper vibrational states of the pumped CO. The temperature of the translational and rotational modes of the pumped gases is maintained at a low value in steady state by the flow through the cell 20. By this means, a higher vibrational energy per CO molecule is achieved in the cell than is typical of the pumping achieved directly in electrically or chemically excited CO lasers.

Initially relatively high gas pressures were used in cell 20, specifically, a CO partial pressure of 0.018 atmospheres and an argon diluent pressure of 28.2 atmospheres. The large preponderance of argon diluent was used to provide a high degree of convective cooling of the test gases and to pressure-broaden the CO absorption lines in an effort to maximize the fraction of pump laser energy absorbed. FIGS. 2a and 2b show typical IR emission spectra from the CO first overtone vibrational band obtained under these conditions and computer-generated, respectively (see reference 3). The pumping laser beam is 175W c.w., distributed over approximately 33 CO vibrational-rotational lines ranging in wavelength from 4.8 to 5.5 $\mu$m. These lines are from vibrational transitions $V = 3 \rightarrow 2$ up to $V = 15 \rightarrow 14$ (see reference 3). FIG. 3 shows the inferred vibrational population distribution. It can be seen that a V-V pumped nonequilibrium population is maintained and measured over at least the first thirty vibrational states of CO.

Where the absorbing and lasing species are identical and have a long relaxation time, such as carbon monoxide, a combination of somewhat higher pump-laser intensities, lower cell pressures, together with certain conditions of flow velocity and gas concentration can result in as much as 70% of the pump-laser beam being absorbed, and power loadings of the CO vibrational mode are obtained which are higher than those obtainable in electric discharge excitation.

Figure 4A:
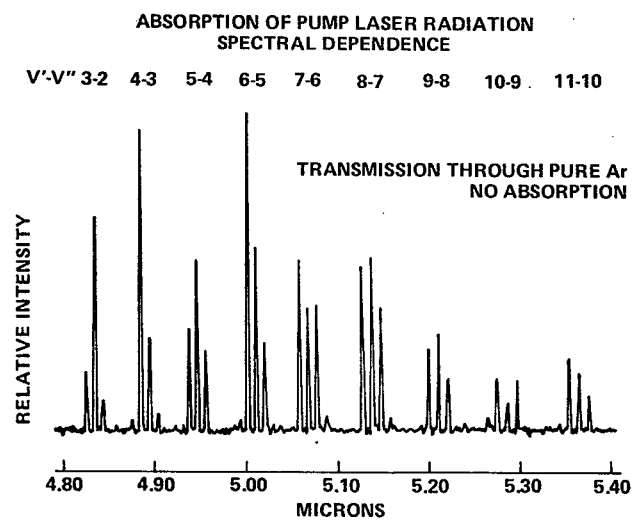
FIG. 4a is a trace of the output of the pump laser.
Figure 4B:
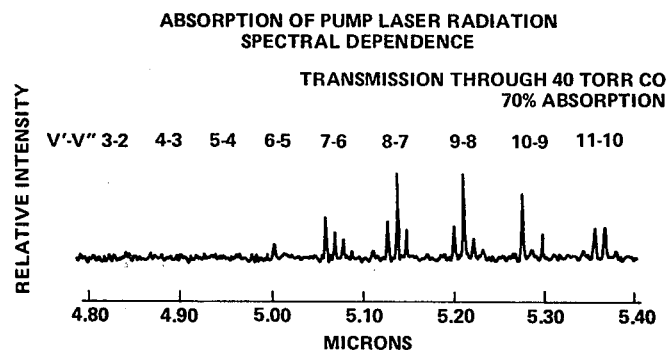
FIG. 4b is a trace of the pump laser transmission through 40 torr of CO.

The details of the mechanism by which the pump laser beam is absorbed at these relatively low pressures remain to be clarified. FIGS. 4a and b show the spectral dependence of the absorption of the pump laser radiation. FIG. 4a shows the output of the pump laser 10 and FIG. 4b shows what is transmitted through 40 torr of CO in the cell 20. In this case, the 40 torr of CO is the total gas pressure in the cell; there is no diluent. The output of the laser beam is distributed among approximately 30 P-branch rotation-vibration lines from the V = 3→2 to V = 11→10 vibrational transitions, the most intense lines being on the lower vibrational transitions. After transmission through the CO in the cell 20, the V = 3→2, 4→3, and 5→4 systems have been entirely absorbed, and the other lower bands are greatly attenuated. The higher vibrational bands transitions are absorbed to a lesser extent. It appears that the absorbing transitions ocurring in the pumped gas are identical to those of the laser emission; given the nature of the V-V pumped distribution in the cell 20, it is predictable that the lower level transitions will be more readily absorbed, due to the higher populations of these states. The major unknown effect, however, is the mechanism by which the V = 2 level of the CO in the cell 20 is initially populated. Since the laser 10 does not emit on the V = 1→0 or V = 2→1 bands, calculation shows that the cell gas would be transparent to the pump radiation, level V = 2 of the pumped gas being negligibly populated at the cell kinetic temperature of approximately 300° K. However, some triggering process does occur to populate the V = 2 level in the small amount necessary to cause significant V = 2→3 absorption; after this triggering occurs, V-V pumping insures an exponentially increasing number of molecules capable of resonance absorption of the pump radiation. Thus, a small number of initial absorbers, such as could be provided by localized heating or the absorption by the natural abundance (1%) of the more nearly resonant $C^{13}O$ isotope, will increase rapidly to provide the observed large total absorptions.

CO DISSOCIATION AND $C_2$ FORMATION

Figure 5:
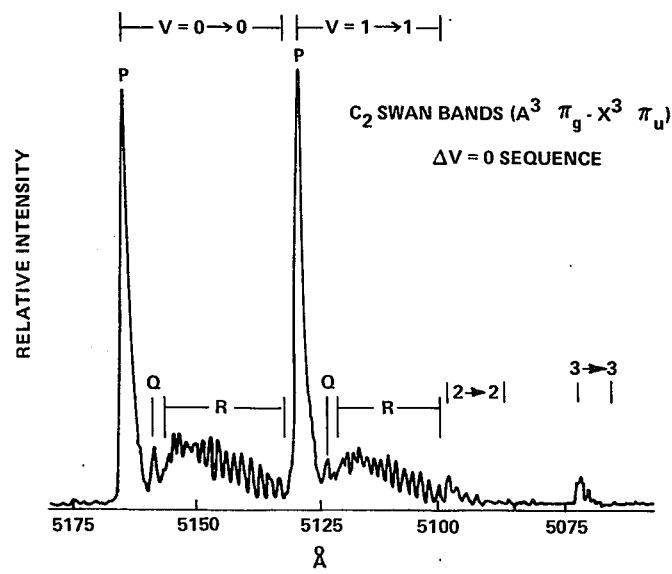
FIG. 5 is a trace of the $C_2$ Swan bands for $\Delta V = 0$ sequence.
Figure 6:
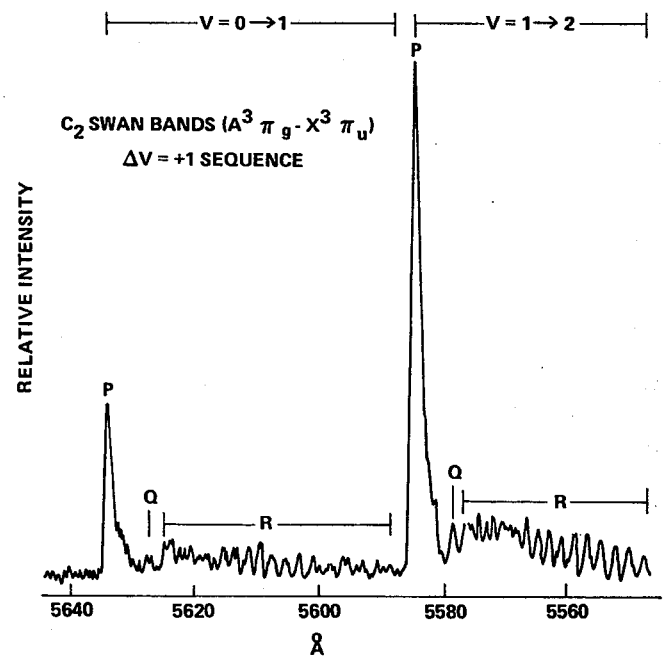
FIG. 6 is a trace of the $C_2$ Swan bands for $\Delta V = +1$ sequence.
Figure 7:
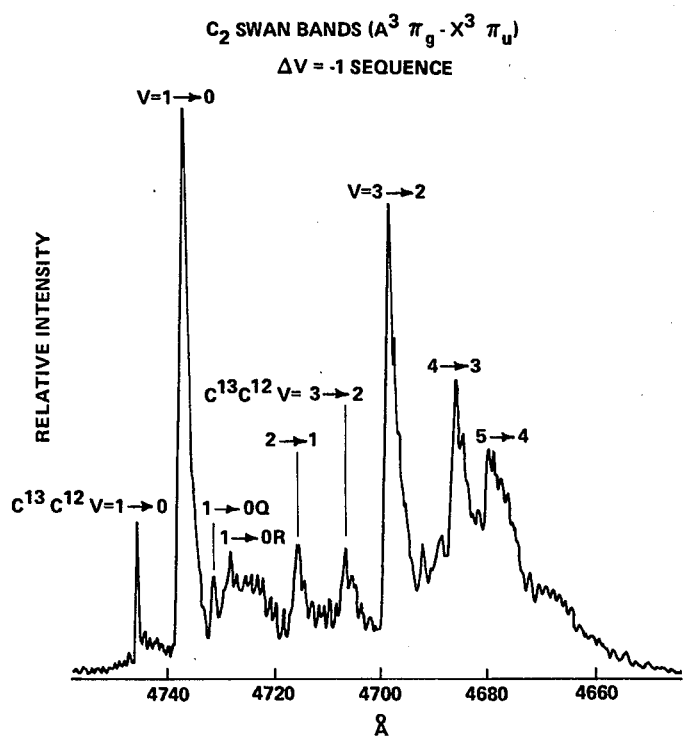
FIG. 7 is a trace of the $C_2$ Swan bands for $\Delta V = -1$ sequence.

It is observed that the energy per CO molecule stored in the vibrational mode increases with decreasing total gas pressure in the absorption cell 20. At total gas pressures below approximately 6 atmospheres in CO/Ar mixtures, a visible blue emission is seen in the pumped gas, the intensity increasing as the pressure decreases. This glow is created by emission from the Swan bands of the $C_2$ molecule. FIGS. 5–7 show typical spectra of these Swan bands, obtained in a flowing mixture of 0.5% CO in Ar, at a total cell pressure of 1.0 atmospheres. The flow velocity was 105 cm/sec, and 20% of the pump-beam power of 250 watts/cm² was absorbed. In contrast to the typical visible emission from CO/He electric laser discharges, no emission from CO electronic bands has been observed.

FIG. 5 shows the $\Delta V = 0$ sequence of these bands, FIG. 6 the $\Delta V = +1$ sequence, and FIG. 7 the $\Delta V = -1$ sequence. Several features of these spectra demonstrate the low rotational temperature of the $C_2$.

In the $\Delta V = 0$ sequence of FIG. 5, for example, separate well-defined, P, Q and R branches can be seen. The P branches are headed, and degrade to the violet, a well-known feature of the $C_2$ Swan bands. A small, distinct Q-branch spike can be seen close to the origin of each band component. This branch is not observed in typical $C_2$ Swan spectra, being only weakly allowed for the $^3\pi$-$^3\pi$ transition. However, due to low rotational temperature, high quantum-number P-branch lines do not obscure this feature. The rotational spacing of the R-branch is sufficiently large to allow considerable rotational structure to be resolved; from the intensity distribution of this band component, a rotational temperature of 300 ± 10° K. is inferred.

Figure 8:
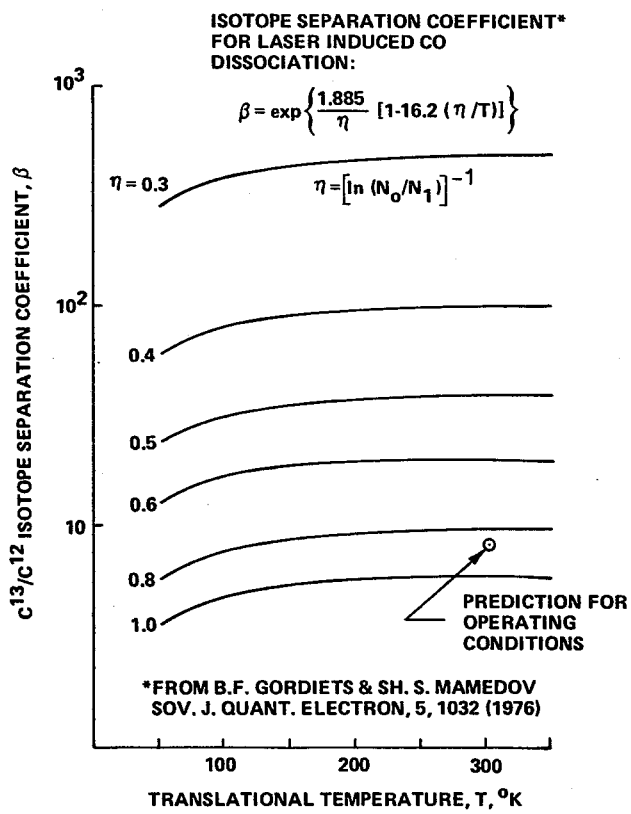
FIG. 8 is a plot of the isotope separation coefficient for laser induced CO dissociation based on Gordiets and Mamedov (reference 1)

The band structure in the spectral region of the $\Delta V = -1$ sequence, FIG. 7, is considerably more complex than the $\Delta V = 0$ and $\Delta V = +1$ spectra. This sequence is overlaid by the "tail band" components of the $C_2$ Swan. However, the V = 1→0, 2→1, 3→2, 4→3 and 5→4 band heads are all clearly resolved. In addition, the V = 1→0 and V = 3→2 heads of the $C^{13}C^{12}$ isotope bands are also resolved. The relative intensities of the $C^{13}C^{12}V = 1$→0 and $C^{12}C^{12}V = 1\Delta 0$ band heads indicate that the $C_2$ product is considerably enriched in $C^{13}$. The normal abundance of $C^{13}$ in carbon is 1.1%; the relative intensities of these 1→0 bands suggest enrichments of several hundred percent. Mass spectrographic analysis of carbon deposited on the cell walls during this dissociation process indicates enrichments in the range of 30–50%. At present, the cause of this apparent discrepancy in isotope enrichment ratio has not been resolved. An analytic solution for binary mixtures of diatomics, such as $C^{13}O/C^{12}O$ under V-V pumped conditions has been obtained by Gordiets and Mamedov (reference 1). A calculated prediction for CO dissociation based on their theory is given in FIG. 8. The "isotope separation coefficient", $\beta$, is the ratio of the specific dissociation rate for $C^{13}O$ to the corresponding rate for $C^{12}O$. This coefficient is plotted against translational temperature for various values of a vibrational energy parameter, $\eta$. $\eta$ is the reciprocal of the log of the ratio of the CO ground vibrational state population to the population of the first excited vibrational state; large $\eta$'s correspond to higher amounts of vibrational excitation. It can be seen that smaller amounts of vibrational excitation give larger separation coefficients; however, the actual rates decrease rapidly with decreasing $\eta$. It is also shown that the separation coefficient is not very sensitive to translational temperature. A point corresponding to the operating conditions ($\eta = 0.83$, T = 300° K.) of most of our work is indicated on FIG. 8. These conditions give a predicted $\beta$ of $\sim 8$; as noted above, enrichments observed to date are less than those suggested by this value. Observed enrichments seem essentially independent of cell temperature; this is in qualitative agreement with the predictions of FIG. 8.

Summarizing the results of the $C_2$ formation, it will be noted that besides the Swan bands, there is evidence of at least one additional band system arising from the lower-lying electronic levels of the $C_2$ molecule. This is the DesLandres-d'Azambuja system ($C'\pi_S - b'\pi_S$) shown in FIG. 9. The energy levels involved in both this system and the Swan bands are all states below 5 eV. It may be indicative of the energy transfer processes occurring in the cell that, energetically, all electronic emission spectra observed can be excited by vibration-to-electronic collisional transfer from the vibrational states of the pumped CO.

CO/$N_2$ MIXTURES; CN FORMATION

Mixtures of CO and $N_2$ in Ar diluent have been optically pumped in the absorption cell 20. The $N_2$ vibrational states are in fairly close resonance with those of CO, and the $N_2$ is vibrationally excited by rapid V-V transfer from the pumped CO; the $N_2$ upper vibrational states are subsequently populated by V-V pumping. At lower pressures, CN formation takes place with strong emission from the CN violet bands being monitored. The CN emission initially increases with the added nitrogen, until the diatomic molecule concentration increases to the point where the energy loading of the vibrational modes is substantially lowered. Beyond this point, CN emission decreases as nitrogen is added.

Figure 9:
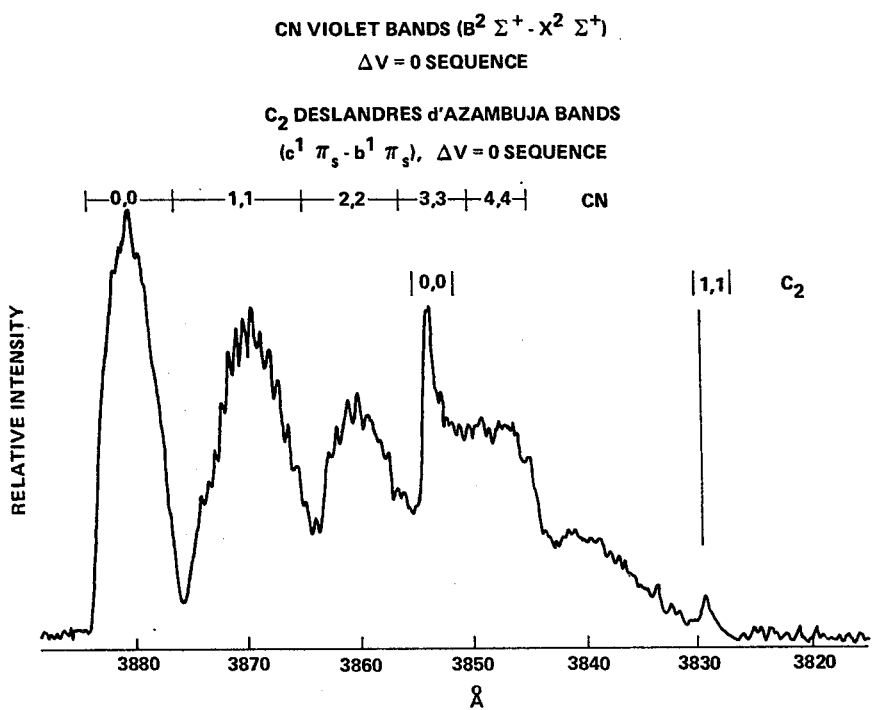
FIG. 9 is a trace of the observed spectra of a CO, $N_2$, Ar mixture.
Figure 10A:
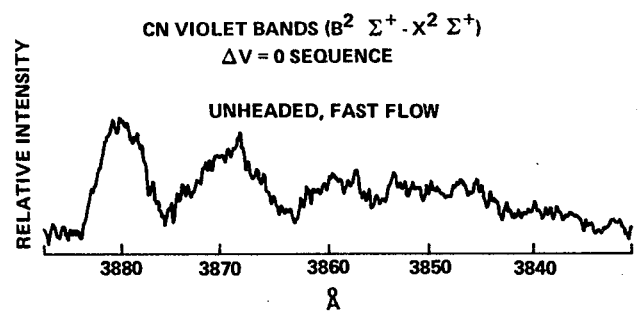
FIG. 10a is a trace of the CN violet $\Delta V = 0$ bands for fast flow.
Figure 10B:
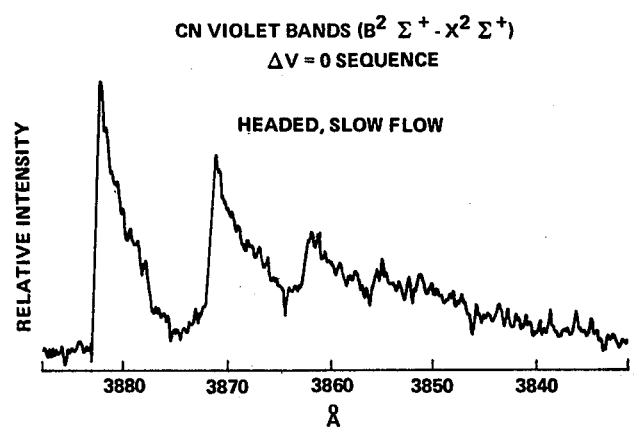
FIG. 10b is a trace of the CN violet $\Delta V = 0$ bands for slow flow.

FIGS. 9, 10a and 10b show the $\Delta V = 0$ sequence of the CN violet bands. The spectrum of FIG. 9 was obtained for a 0.4% CO, 1.4% $N_2$, 98.2% Ar mixture at a total cell pressure of 350 torr and a flow velocity of 943 cm/sec. In addition to the $V = 0 \rightarrow 0$, $1 \rightarrow 1$, $2 \rightarrow 2$, $3 \rightarrow 3$, and $4 \rightarrow 4$ components of the CN $\Delta V = 0$ sequence, the $V = 0 \rightarrow 0$ and $1 \rightarrow 1$ components of the $C_2$ DesLandres-d'Azambuja bands are also seen. In these CN spectra the well-known P-branch band heads are not observed. This lack of heading is caused by the low rotational temperature of the CN (approximately 300° K.). The P-branch band heads for the CN system occur at rotational quantum level $J = 28$; such high rotational levels are not populated at 300° K., and hence the head does not form. This feature is further illustrated in FIGS. 10a and b where the same CN violet $\Delta V = 0$ bands are shown. In FIG. 10a the unheaded bands are again shown, being created in the cell with a flow velocity of ~ 1000 cm/sec. In FIG. 10b the flow velocity had deliberately been slowed down drastically, allowing the translational/rotational temperature of the gas to rise. The band heads become immediately apparent.

Analysis of the details of the CN formation observed can be performed using theory such as that presented in Reference 1. Application of such theory shows that the CN formed by the V-V pumping process should be isotopically enriched in both $C^{13}$ and $N^{15}$, in a manner analogous to the previously achieved $C^{13}$ enrichment during $C_2$ formation. Detailed measurements to determine the relative concentrations of the CN isotopes have, however, not yet been made.

Although preferred embodiments of the present invention have been illustrated and described, other changes will occur to those skilled in the art. For example, the isotopically enriched $C_2$ may be burned to form CO and reprocessed to obtain further isotopic enrichment. Other laser sources may be used and the laser cell windows will be mounted at the proper Brewster's angle for the wavelength of the laser radiation and the material of the windows to minimize laser radiation losses due to reflections off the windows. The lasant species of the pump laser need not be one of the species present in the absorption cell since the resonant absorption of pump laser radiation emission by the reacting species is the controlling factor in choosing the pump lasant. Finally, the mixture of gases in the absorption cell need not be confined to only diatomic species such as CO and $N_2$. A polyatomic species, such as $CO_2$, capable of rapid excitation of its vibrational mode via inelastic collisions with the resonantly absorbing species can also be added. The vibrational excitation of this species can also result in preferential chemical reaction. It is therefore intended that the scope of the present invention is to be limited only by the scope of the appended claims.

REFERENCES

1. B. F. Gordiets and Sh. S. Mamedov, "Isotope Separation in Chemical Reactions of Vibrationally Excited Molecules", Sov. J. Quant. Electron. 5, 1082 (1976).
2. J. W. Rich, R. C. Bergman, and J. A. Lordi, "Electrically Excited, Supersonic Flow Carbon Monoxide Laser", AIAA J. 13, 95 (1975).
3. J. W. Rich, R. C. Bergman, and J. W. Raymonda, "Vibration-Vibration Pumping of Carbon Monoxide Initiated by An Optical Source", Appl. Phys. Lett. 27, 656 (1975).
4. C. E. Treanor, J. W. Rich and R. G. Rehm, "Vibrational Relaxation of Anharmonic Oscillators with Exchange-Dominated Collisions", J. Chem. Phys. 48, 1798 (1968).

We claim:

1. A method for initiating chemical reactions in a mixture of flowing gases by low pressure optical pumping including the steps of:
   supplying a mixture of gases, including at least one species capable of resonant absorption of pump radiation, to an absorption cell;
   flowing the mixture of gases through the absorption cell; and
   irradiating the mixture of gases in the absorption cell with radiation from a pump laser having a lasant species which produces radiation capable of resonant absorption by said at least one species whereby said at least one species in the absorption cell absorbs pump laser radiation in the lower vibrational states of said at least one species and by vibration-to-vibration pumping populates the upper vibrational states of said at least one species.

2. The method of claim 1 wherein said at least one species is the same as the lasant species of the pump laser.

3. The method of claim 1 wherein said mixture of gases is a mixture of carbon monoxide and diluent whereby the carbon monoxide dissociates and subsequently forms $C_2$ that is isotopically enriched in $C^{13}$.

4. The method of claim 1 wherein said mixture of gases is a mixture of carbon monoxide, nitrogen and diluent whereby the carbon monoxide and nitrogen react to form cyanogen that is isotopically enriched in $C^{13}$ and $N^{15}$.

5. The method of claim 1 wherein said mixture of gases is a mixture of carbon monoxide and at least one diatomic or polyatomic species possessing vibrational energy modes capable of rapid collisional vibration-vibration energy transfer with said carbon monoxide whereby the upper vibrational states of said at least one diatomic or polyatomic species are populated by vibration-vibration pumping and said at least one diatomic or polyatomic species can then chemically react at a more rapid rate than is possible without vibrational excitation.

* * * * *